United States Patent [19]
Susuki et al.

[11] 3,856,746
[45] Dec. 24, 1974

[54] THERMOPLASTIC COMPOSITION FOR MOLDING

[75] Inventors: Rinnosuke Susuki, Tokyo; Hiroshi Hoshi, Narashino; Jiro Saito, Tokyo; Keiichi Murakami, Sendai; Hisashi Yamada, Ichikawa, all of Japan

[73] Assignee: Lion Fat & Oil Co. Ltd., Tokyo, Japan

[22] Filed: June 4, 1973

[21] Appl. No.: 366,417

Related U.S. Application Data

[63] Continuation-in-part of Ser. No. 185,436, Sept. 30, 1971, abandoned, which is a continuation of Ser. No. 842,391, July 16, 1969, abandoned.

[30] Foreign Application Priority Data

| July 22, 1968 | Japan | 43-51218 |
| Sept. 9, 1968 | Japan | 43-64276 |
| Feb. 15, 1969 | Japan | 44-11393 |

[52] U.S. Cl.......... 260/42.24, 106/306, 260/37 N, 260/40 R, 264/300
[51] Int. Cl. ..................... C08f 45/04, C08g 51/04
[58] Field of Search....... 260/41, 37 N, 40 R, 42.24; 106/306

[56] References Cited
UNITED STATES PATENTS

| 2,375,786 | 5/1945 | Haywood et al. | 423/512 |
| 2,865,779 | 12/1958 | Allen | 106/306 |
| 3,409,568 | 11/1968 | Holladay | 260/8 |
| 3,455,863 | 7/1969 | Williams | 260/33.4 |

FOREIGN PATENTS OR APPLICATIONS

| 1,044,503 | 10/1966 | Great Britain | 260/41 |

OTHER PUBLICATIONS

Encyclopedia of Poly. Sci. and Tech., II, pages 566 and 568, Interscience 1965 TP 156 P6E6.

*Primary Examiner*—Morris Liebman
*Assistant Examiner*—J. H. Derrington
*Attorney, Agent, or Firm*—Woodhams, Blanchard and Flynn

[57] ABSTRACT

The invention relates to a novel thermoplastic resin composition of improved color and strength characteristics consisting essentially of a thermoplastic resin and (1) calcium sulfite or (2) a mixture of calcium sulfite and a calcium sulfate compound; optionally also with a minor amount of glycerine, ethylene glycol and boric acid.

5 Claims, No Drawings

THERMOPLASTIC COMPOSITION FOR MOLDING

CROSS REFERENCE TO RELATED APPLICATIONS

This application is a continuation-in-part of our copending application Ser. No. 185,436 filed Sept. 30, 1971, now abandoned which in turn is a continuation of Ser. No. 842,391 filed July 16, 1969, now abandoned.

BACKGROUND OF THE INVENTION

A wide variety of thermoplastic resins have been used in molding compositions for molded products, including such materials as polyethylene, polypropylene, vinyl chloride-vinyl acetate copolymer and acrylonitrile-butadiene-styrene copolymer. Fillers have been used to make up as much as 20 parts per hundred rubber (PHR). Greater proportions of prior fillers have been avoided, as they tend to impair the strength of the molded articles. This applies to such filler materials as calcium carbonate, clay, silica, and the like.

The use of up to 20 PHR filler does not bring about a substantial reduction in cost of the molded articles. In order to widen the scope of potential use of thermoplastic resins as packaging materials such as film, sheets and receptacles it is technically important that the resin material be produced at minimum cost and its volume and capacity extended to the maximum, particularly when the goods to be packaged are low-cost or high volume materials. Prior to this invention, however, no thermoplastic resin material containing larger proportions of satisfactory filler has been developed, particularly without impairing the strength and other relevant properties, such as color of the molded resin material.

In U.S. Pat. No. 3,463,765 there is disclosed the use of a wide variety of conventional fillers, including calcium sulfate in a special polyvinyl chloride mixture containing certain nitrogen substituted acetyl compounds as agents for controlling the orientation and shrink characteristics of film. There is no suggestion that calcium sulfate or any of the other conventional fillers affects the tensile strength.

SUMMARY OF THE INVENTION

According to this invention a thermoplastic resin material is provided using calcium sulfite as filler for a thermoplastic resin, the molded article having unimpaired strength, working characteristics and stability and improved color properties, yet which may contain much larger proportion of filler than heretofore possible. More particularly, this invention relates to a thermoplastic moldable resin composition consisting essentially of a mixture of (1) 20 to 90 percent, preferably 60 to 75 percent, by weight, based on the total weight of the composition, of a finely divided filler material selected from the group consisting of (a) anhydrous calcium sulfite having a particle size of less than about 60μ and calcium sulfite hemihydrate having a particle size of less than about 60μ and (b) a mixture of at least 20% by weight, based on the total weight of the composition, of said calcium sulfite and the balance being a calcium sulfate compound selected from the group consisting of anhydrous calcium sulfate having a particle size of less than about 60μ, calcium sulfate hemihydrate having a particle size of less than about 60μ and calcium sulfate dihydrate having a particle size of less than about 150μ and (2) the balance of the composition is resin ingredient consisting of (a) from 0 to 5 percent by weight, based on the total weight of the composition of an ethylene-propylene rubber or a styrene-butadiene rubber and the balance of the resin ingredient (2) being (b) a resin selected from the group consisting of polyolefin, polyvinylchloride, polystyrene, vinyl chloride - vinyl acetate copolymer, ethylene - propylene copolymer, acrylonitrile-butadiene-styrene copolymer, polyamide, polyester and mixtures of polyethylene and ethylene - vinyl-acetate copolymer.

The function of the rubber constituent (a) is as a viscosity improver, and its use is optional.

There can also be employed from 0.1 to 5 percent by weight, based on the total weight of the composition, of glycerine or ethylene glycol to improve mold releasability, and their use is also optional.

There can also be employed from 0.03 to 2.5 percent by weight, based on the total weight of the composition, of boric acid. Its use is optional.

DESCRIPTION OF THE PREFERRED EMBODIMENTS

The term "thermoplastic resin" as used herein includes polyolefins such as polyethylene and polypropylene and copolymers thereof and mixtures thereof, polyvinyl chloride, copolymers of vinyl chloride and vinyl acetate, copolymers of acrylonitrile, butadiene and styrene, polyamides and polyesters. The term includes mixtures of these polymers. A typical thermoplastic resin for use in this invention is polyethylene, for example, polyethylene produced from the medium-pressure polymerization process.

A typical rubber to be used as viscosity improver is a synthetic rubber such as ethylene-propylene rubber.

The calcium sulfite can be used in the form of either calcium sulfite hemihydrate or anhydrous calcium sulfite in any crystal form to be used as filler in this invention preferably has a grain size of less than about 60μ.

The calcium sulfate can be used in the form of either calcium sulfate hemihydrate or anhydrous calcium sulfate in any crystal form of particle size less than 60μ. The calcium sulfate can also be used in the form of calcium sulfate dihydrate having a particle size of less than about 150μ.

The calcium sulfite hemihydrate can be that obtained by neutralizing milk of lime with sulfur dioxide. However an economically advantageous method of making a suitable calcium sulfite is by utilizing the carbide grounds produced as by-products of the wet-type acetylene producing process in the acetylene chemical industry, and the sulfur produced as a by-product of the petrochemical industry. The calcium sulfite thus produced consists of fine particles having a grain size of less than 5μ and can be employed directly as filler in the products of this invention. The anhydrous calcium sulfite can be obtained by calcination of calcium sulfite hemihydrate at a temperature range from 400°C to 450°C. The anhydrous calcium sulfite thus produced consists of fine particle having a grain size of less than 5μ the same as the original calcium sulfite hemihydrate particles.

The calcium sulfate compounds employed in this invention can be anhydrous calcium sulfate, calcium sulfate hemihydrate or calcium sulfate dihydrate. The crystal form of the calcium sulfate is not critical, and any can be used. The grain size of either the anhydrous form or the hemihydrate should be less than 60μ, because the maximum percentage miscible in a thermoplastic resin of these substances with greater grain size is less than 60%, whereas the percentage increases with grain size less than 60μ. At a grain size of 30–40μ it is about 90%. The maximum amount of calcium sulfate dihydrate is not substantially affected by variation of grain size; for example, it is miscible up to 90% at a grain size of 150μ.

Percentages given in this specification, unless specified otherwise are percent by weight.

Suitable calcium sulfate compounds are mass-produced as by-products of the wet-process phosphate industry, and also are obtained as natural products, with the exception of calcium sulfate hemihydrate. As to calcium sulfate hemihydrate and anhydrous calcium sulfate having a grain size of less than 60μ, they can be obtained either through conventional pulverization and calcination or by a process comprising the steps of placing calcium sulfate hemihydrate or soluble anhydrous calcium sulfate having a larger than suitable grain size in the smallest quantity of water required to convert it into calcium sulfate dihydrate and subsequently pulverizing and calcining the thus obtained calcium sulfate dihydrate. According to the present invention, however, the calcium sulfate compounds thereto are not limited to those produced by the foregoing processes, as any calcium sulfate prepared by any method will do.

The presence of polyhydric alcohol, such as glycerine or ethylene glycol, as an additive in the thermoplastic resin composition for molding, will not only prevent the deterioration of the strength of the moldings thereof even when a very large quantity of such fillers as calcium sulfite, calcium sulfate compound and the like is used, but also will bring about a satisfactory mold releasability. And, said effect will be further enhanced if boric acid is present in the thermoplastic resin composition. The preferable mol ratio of polyhydric alcohol to boric acid is about 2 : 1.

The appropriate filler content is in the range of 20–90%. When the filler content is less than 20% there is no advantage gained by the use of fillers, whereas when it exceeds 90% the molding characteristics of thermoplastic resin are diminished. The amount of glycerine or ethylene glycol to be added is correlated with the mechanical strength of the molded goods, but practically it is in the range of 0.1–5%. Further, as to the amount of boric acid, the number of mols thereof is one-half that of the polyhydric alcohol employed, and there is no need to use it in higher amounts.

According to the present invention, it is also possible to mix rubber of the ethylene-propylene family or styrene-butadiene family as a viscosity improver, and the mixing amount thereof is about 5 wt% at the most. As to the rubber for such purpose, synthetic rubber of the ethylene-propylene type is most suitable from the viewpoint of heat-resistance. However, in view of the price of synthetic rubber, it is advisable to employ it as little as possible. Any of the conventional plasticizers is applicable in the present invention.

As discussed above, this invention relates to compositions of thermoplastic resin and the above-stated fillers, which can also comprise glycerine or ethylene glycol, together with such appropriate conventional additives as viscosity improvers or plasticizers. The molded articles produced by this invention can be compounded and molded by conventional techniques. Thus on heating and kneading the mixture consisting of these novel compositions, either by directly calendering the kneaded mixture or by extrusion molding (such as injection molding, blow molding, etc.) upon powdering or pelleting said kneaded mixture, milk-white moldings are obtained.

The calcium sulfite and calcium sulfate used as the filler in the compositions according to the present invention capable of producing such moldings, respectively work as follows. That is to say, calcium sulfate as a component of the filler usually contains a small amount of iron and is colored, but such coloring is eliminated by virtue of the coexistence of calcium sulfite. Not only that, said calcium sulfite has the effect of bleaching the whole composition to eliminate even such coloring which is not attributable to iron contained in the composition. Moreover, the moldings obtained from a composition containing both fillers display improved strength characteristics compared with moldings obtained from a composition containing only one of the two fillers.

Example 1
(1) Sheet-molding
Type of the roll employed : dual roll
diameter : 89mm, length : 200mm
ratio of the number of rotations 16 : 19
Compound ratio
(A)
polyethylene (commercial polyethylene 27%
from medium-pressure polymerization process)
ethylene-propylene rubber            2.7%
$CaSO_3 \cdot \tfrac{1}{2}H_2O$            70.3%
(B)
polyethylene (commercial polyethylene)   27%
from medium-pressure polymerization
process)
ethylene-propylene rubber            2.7%
$CaSO_3$            70.3%

| | |
|---|---|
| Processing temperature | 160 ± 5°C |
| Processing time | 10 – 15 minutes |
| Roll clearance | 0.16mm |
| Thickness of sheet | 0.2mm (one axial drawing) |
| Strength of sheet | Tester employed : Elemendorf tear tester |

| | (A) | (B) |
|---|---|---|
| lengthwise | 203g | 401g |
| crosswise | 283g | 455g |

(2) Injection-molding
Compounding ratio
polyethylene (commercial polyethylene     35%
from high-pressure polymerization
process
ethylene-propylene rubber            5%
$CaSO_3 \cdot \tfrac{1}{2}H_2O$            60%

After mixing with a Henschel mixer, the compound was injection-molded to form cups measuring 73mm in the outside diameter, 1mm in thickness and 70mm in height. (Pin-gate type metal pattern was employed.)

| | |
|---|---|
| Temperature of resin | 250°C |
| Pressure for injection | 25kg/cm² |
| Time for cooling | 10 sec/cycle |
| Compression load test | 114kg |
| Drop test | Strength was tested by dropping the cup 20 times from the height of 2m onto a concrete floor, but no damage was observed. |

(3) Blow-molding
Compounding ratio
polyethylene (commercial polyethylene    35%
from high-pressure polymerization process)
ethylene-propylene rubber            5%
$CaSO_3 \cdot \tfrac{1}{2}H_2O$            60%

After mixing with Henschel mixer, the compound was blow-molded, to form cylindrical bottles of JIS 300cc, weighing 35g each. (Screw employed : cross-saw model-F of 400mm diameter)

| | |
|---|---|
| Temperature of resin | 200 – 240°C |
| Rate of rotation of the screw | 20rpm |
| Electricity supplied to the motor | 14A |
| Molding cycle | 15 sec/cycle |
| Compression load test | 15kg |
| Drop test | Strength was tested by dropping the bottle containing 200cc of water from the height of 2m onto a concrete floor, but no damage was observed. |

Example 2

(1) Type of the roll employed : dual roll
 diameter: 89mm, length: 200 mm
 ratio of the number of rotations 16 : 19
(2) Compounding ratio
 polyethylene (commercial polyethylene from medium-pressure polymerization process) 27%
 ethylene-propylene rubber 2.5%
 (viscosity improver)
 filler (a mixture of calcium sulfite and calcium sulfate as tabulated below) 70.5%
(3) Processing conditions
 processing temperature 160 ± 5°C
 processing time 10–15 minutes
 roll clearance 0.16mm
 thickness of sheet 0.2mm (one axial drawing)

Under the above conditions, calcium sulfate (dihydrate) and calcium sulfite (anhydrous) employed as the filler were compounded by applying various mixing ratios and were kneaded. The tensile strength of the resultant sheets was measured as follows:

| | |
|---|---|
| tester employed: | Schopper type tension tester |
| test method: | JIS Z 1702-1957 |

| Compounding ratio of fillers (%) | | Tension strength (kg/cm²) | | Whiteness |
|---|---|---|---|---|
| calcium sulfate | calcium sulfite | lengthwise | crosswise | |
| 0 | 100 | 420 | 205 | superior |
| 20 | 80 | 445 | 245 | do. |
| 40 | 60 | 565 | 280 | do. |
| 60 | 40 | 550 | 275 | good |
| 80 | 20 | 505 | 280 | do. |
| 100* | 0 | 400 | 210 | inferior |

Note: Sheet marked with * is a comparative example

Example 3
 Compounding ratio:
 polyethylene 27%
 (commercial polyethylene from medium-pressure polymerization process)
 ethylene-propylene rubber 2.5%
 (viscosity improver)
 calcium sulfite hemihydrate 70.5%

A mixture of the above compounding ingredients was divided into several batches, and to each respective batch was added 99%-pure glycerine in varying quantities ranging from 0.5% to 7%. Subsequently, by employing those batches respectively, 0.2mm-thick sheets were produced by means of a dual roll (88mm in diameter, 200mm in length and rpm ratio of the number of rotations 16 : 19) and under the following conditions.

| | |
|---|---|
| processing temperature | 160 ± 5°C |
| processing time | 10–15 minutes |
| roll clearance | 0.16mm |

The tear resistance of sheets thus obtained as compared with a sheet manufactured without employing glycerine was as shown in the following table.

| Amount of glycerine added (wt%) | Tear resistance of 0.2mm- thick sheet (g) | | Processing efficiency |
|---|---|---|---|
| | lengthwise | crosswise | |
| 0 | 592 | 465 | inferior |
| 0.5 | 613 | 472 | a little inferior |
| 1 | 647 | 476 | good |
| 2 | 820 | 481 | do. |
| 3 | 872 | 482 | do. |
| 5 | 956 | 487 | do. |
| 7 | 714 | 463 | do. |

Example 4
 Compounding ratio:
 polyethylene 35%
 (commercial polyethylene from medium-pressure polymerization)
 ethylene-propylene rubber 5%
 (viscosity improver)
 calcium sulfite hemihydrate 60%

A mixture of the above compounding ingredients was divided into several batches, and to each respective batch was added glycerine in varying quantities ranging from 0.5% to 7%. After mixing by means of Henschel mixer, the batches of mixture were respectively injection molded to form cups measuring 73mm in outside diameter, 1mm in thickness and under the following conditions and by employing a pin-gate type metal pattern.

| | |
|---|---|
| Molding conditions: | |
| temperature of resin | 170–180°C |
| pressure for injection | 35kg/cm² |
| molding cycle | 25 sec/cycle |

The respective moldings produced under said conditions were tested for strength by means of repeatedly dropping them from the height of 2m onto a concrete floor. The number of times of dropping required before they were broken were as shown in the following table in comparison with that in case of moldings prepared without employing glycerine.

| Amount of glycerine employed (Wt%) | Impact resistance |
|---|---|
| 0 | 1 |
| 0.5 | 1 |
| 1 | 2 |
| 2 | 3 |
| 3 | 7 |
| 5 | 7 |
| 7 | 3 |

Example 5

Compounding ratio:
- polyethylene (commercial polyethylene from medium-pressure polymerization process) — 27%
- ethylene-propylene rubber (viscosity improver) — 2.5%
- calcium sulfite hemihydrate — 70.5%

By means of adding 2% of various mixtures of glycerine and boric acid (having a mol ratio of glycerine to boric acid of 1 : 4, 1 : 2, 1 : 1, 2 : 1, and 4 : 1 respectively) to a mixture of the foregoing compounding ingredients and applying the same processing conditions as Example 1, 0.2mm-thick sheets were molded. The processing efficiency of any one of them was satisfactory. The tear resistance of the respective sheets thus obtained was as shown in the following table in comparison with that in case of moldings wherein no mixture of glycerine and boric acid was employed.

| Glycerine : boric acid (mol ratio) | Tear resistance of 0.2mm-thick sheet (g) | |
|---|---|---|
| | lenthwise | crosswise |
| 1 : 4 | 618 | 476 |
| 1 : 2 | 640 | 492 |
| 1 : 1 | 745 | 491 |
| 2 : 1 | 963 | 540 |
| 4 : 1 | 724 | 488 |
| nil | 592 | 465 |

Example 6

(1) Type of the roll employed: dual roll
   diameter: 89mm, length: 200mm
   ratio of the number of rotations 16 : 19
(2) Compounding ratio
   - polystyrene — 29%
   - calcium sulfite hemihydrate — 68%
   - styrene-butadiene rubber — 3%
(3) Processing condition
   - processing temperature — 150 ± 5°C
   - processing time — 10–15 minutes
   - roll clearance — 0.16mm
   - thickness of sheet — 0.2mm The tensile strength of the sheet thus obtained was 318kg/cm² (lengthwise) and 265kg/cm² (crosswise).

Example 7

(1) Type of the roll employed: same as Example 6
(2) Compounding ratio
   - polyvinyl chloride — 25.5%
   - di n-octyl phthalate — 2%
   - lead stearate — 1%
   - styrene-butadiene rubber — 3%
   - lead sulfate — 1.5%
   - calcium sulfite hemihydrate — 67%
(3) Processing condition: same as Example 6

The tensile strength of sheet thus obtained was 356kg/cm² (lengthwise) and 274kg/cm² (crosswise).

Example 8

(1) Compounding ratio
   - ethylene-propylene copolymer — 38%
   - calcium sulfite hemihydrate — 62%
(2) Processing condition
   - temperature — 180–200°C
   - pressure for injection — 40kg/cm²
   - molding cycle — 16 sec/cycle Under the above conditions, the compound was injection molded to form cups measuring 50mm in outside diameter and 85mm in height.

The mechanical strength, the thermostability and the chemical resistance of the cups thus obtained were respectively similar as compared with the same of cups manufactured by polyethylene or polypropylene without calcium sulfite filler.

Example 9

(1) Compounding ratio
   - polyethylene (commercial polyethylene, from medium-pressure polymerization process) — 18
   - ethylene-vinylacetate copolymer — 22%
   - calcium sulfite hemihydrate — 60%
(2) Processing condition
   - temperature — 150°C
   - molding cycle — 10 sec/cycle
   - a quantity for extrusion (each one head) — 420g/min.
   - pressure for extrusion — 150kg/cm²

Under the above conditions, the compound was blow molded, to form bottles of capacity of 300cc.

The mechanical strength, the chemical resistance and the stability to deformation of the bottles thus obtained were respectively similar as compared with the same of bottles manufactured by polyethylene without calcium sulfite filler.

Example 10

(1) Type of roll employed: same as Example 6
(2) Compounding ratio
   - polyethylene (commercial polyethylene medium-pressure polymerization) — 9%
   - calcium sulfite hemihydrate — 90%
   - ethylene-propylene rubber — 1%
(3) Processing condition
   - temperature — 160 ± 5°C
   - time — 20–25 minutes
   - roll clearance — 0.18mm
   - thickness of sheet — 0.2mm The tear resistance of sheet thus obtained was 62g (lengthwise) and 45g (crosswise).

The embodiments of the invention in which an exclusive property or privilege is claimed are defined as follows:

1. A thermoplastic moldable resin composition consisting essentially of a mixture of (1) 20 to 90 percent by weight, based on the total weight of the composition, of a finely divided filler material selected from the group consisting of calcium sulfite hemihydrate having a particle size of less than about 60$\mu$ and anhydrous calcium sulfite having a particle size of less than about 60μ, as the sole filler material in said composition and (2) the balance of the composition is resin ingredient consisting of (a) from 0 to 5 percent by weight, based on the total weight of the composition, of an ethylene-propylene rubber or a styrene-butadiene rubber and the balance of the resin ingredient (2) being (b) a resin selected from the group consisting of polyolefin, polyvinyl-chloride, polystyrene, vinyl chloride - vinyl acetate copolymer, ethylene - propylene copolymer, acrylonitrile-butadiene - styrene copolymer, polyamide, polyester and mixtures of polyethylene and and ethylene - vinyl - acetate copolymer.

2. A thermoplastic moldable resin composition according to claim 1, containing in addition from 0.1 to 5 percent by weight of glycerine or ethylene glycol.

3. A thermoplastic moldable resin composition according to claim 2, containing in addition from 0.03 to 2.5 percent by weight of boric acid.

4. A thermoplastic moldable resin composition according to claim 1, in which said resin is a polyolefin.

5. A thermoplastic moldable resin composition according to claim 1, in which said filler material is from 60 to 90 percent by weight, based on the total weight of the composition.

* * * * *